United States Patent
Rittle et al.

(10) Patent No.: US 9,131,015 B2
(45) Date of Patent: Sep. 8, 2015

(54) HIGH AVAILABILITY EVENT LOG COLLECTION IN A NETWORKED SYSTEM

(71) Applicant: Google Technology Holdings LLC, Mountain View, CA (US)

(72) Inventors: Loren J. Rittle, Lake Zurich, IL (US); Douglas A. Kuhlman, Inverness, IL (US); Gregory L. Singer, Arlington Heights, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 305 days.

(21) Appl. No.: 13/646,798

(22) Filed: Oct. 8, 2012

(65) Prior Publication Data

US 2014/0101110 A1   Apr. 10, 2014

(51) Int. Cl.
   *H04L 29/14* (2006.01)
   *G06F 17/30* (2006.01)

(52) U.S. Cl.
   CPC .......... *H04L 69/40* (2013.01); *G06F 17/30165* (2013.01)

(58) Field of Classification Search
   CPC ..................... G06F 17/30165; H04L 69/40
   USPC .......................................... 707/654, E17.005
   See application file for complete search history.

(56) References Cited

U.S. PATENT DOCUMENTS

| | | | |
|---|---|---|---|
| 5,426,774 A | | 6/1995 | Banerjee et al. |
| 5,991,809 A | * | 11/1999 | Kriegsman .................... 709/226 |
| 6,460,141 B1 | * | 10/2002 | Olden ............................... 726/4 |
| 6,633,538 B1 | * | 10/2003 | Tanaka et al. ................. 370/222 |
| 6,691,165 B1 | * | 2/2004 | Bruck et al. ................... 709/227 |
| 6,694,447 B1 | | 2/2004 | Leach et al. |
| 6,789,182 B1 | | 9/2004 | Brothers et al. |
| 6,801,949 B1 | * | 10/2004 | Bruck et al. ................... 709/232 |
| 6,850,982 B1 | * | 2/2005 | Siegel ............................ 709/227 |
| 6,892,236 B1 | * | 5/2005 | Conrad et al. ................. 709/224 |
| 7,421,492 B1 | * | 9/2008 | Malnati et al. ................. 709/224 |
| 7,480,737 B2 | * | 1/2009 | Chauffour et al. ............ 709/245 |
| 7,650,367 B2 | | 1/2010 | Arruza |
| 7,653,633 B2 | * | 1/2010 | Villella et al. ................. 707/648 |
| 7,698,400 B1 | * | 4/2010 | Beloussov et al. ............ 709/223 |

(Continued)

OTHER PUBLICATIONS

Cook, Jonathan E. et al: "Balboa: A Framework for Event-Based Process Data Analysis", Event-Based Process Data Analysis, Proceedings of the 5th International Conference on the Software Process, 1998, all pages.

(Continued)

*Primary Examiner* — Phuong Thao Cao
(74) *Attorney, Agent, or Firm* — Honigman Miller Schwartz and Cohn LLP

(57) ABSTRACT

A method includes storing data received at a first server to a first file and storing data received at a second server to a second file, where the data in the two files are substantially similar. The two files are distinct, independent files. The first server provides a copy of the first file to the second server to store. The first server then stores additional data to the first file, while the second server maintains the copy of the first file unchanged. The second server may also provide a copy of the second file to the first server to store and continues to store additional data to the second file, while maintaining the copy of the second file on the first server unchanged. Event reports may then be generated using the various files, which provide high availability due to the above method and corresponding system arrangement.

19 Claims, 5 Drawing Sheets

(56) References Cited

U.S. PATENT DOCUMENTS

| | | | | |
|---|---|---|---|---|
| 7,882,062 | B2* | 2/2011 | Holenstein et al. | 707/610 |
| 8,135,839 | B1* | 3/2012 | Wormley et al. | 709/226 |
| 8,438,140 | B2* | 5/2013 | Polo-Malouvier et al. | 707/694 |
| 8,972,547 | B2* | 3/2015 | Christenson | 709/222 |
| 2002/0065879 | A1* | 5/2002 | Ambrose et al. | 709/203 |
| 2002/0073337 | A1* | 6/2002 | Ioele et al. | 713/201 |
| 2003/0061305 | A1* | 3/2003 | Copley et al. | 709/217 |
| 2003/0145083 | A1* | 7/2003 | Cush et al. | 709/224 |
| 2004/0111523 | A1* | 6/2004 | Hall et al. | 709/230 |
| 2005/0102405 | A1* | 5/2005 | Siegel | 709/227 |
| 2005/0114706 | A1* | 5/2005 | DeStefano et al. | 713/201 |
| 2005/0138111 | A1* | 6/2005 | Aton et al. | 709/201 |
| 2005/0210331 | A1* | 9/2005 | Connelly et al. | 714/26 |
| 2006/0095470 | A1* | 5/2006 | Cochran et al. | 707/104.1 |
| 2006/0112175 | A1* | 5/2006 | Sellers et al. | 709/223 |
| 2006/0143243 | A1* | 6/2006 | Polo-Malouvier et al. | 707/203 |
| 2006/0282540 | A1* | 12/2006 | Tanimoto | 709/228 |
| 2007/0124437 | A1* | 5/2007 | Chervets | 709/223 |
| 2009/0013007 | A1* | 1/2009 | Caner | 707/201 |
| 2009/0055515 | A1 | 2/2009 | Olesinski et al. | |
| 2009/0070571 | A1* | 3/2009 | Neely | 713/1 |
| 2009/0248753 | A1* | 10/2009 | Tsai et al. | 707/202 |
| 2011/0022574 | A1* | 1/2011 | Hansen | 707/698 |
| 2011/0106756 | A1* | 5/2011 | Geist | 707/610 |
| 2011/0184913 | A1* | 7/2011 | Hayden et al. | 707/652 |
| 2011/0252001 | A1* | 10/2011 | Bensinger | 707/658 |
| 2011/0270855 | A1* | 11/2011 | Antonysamy | 707/756 |
| 2011/0276685 | A1* | 11/2011 | de Waal et al. | 709/224 |
| 2011/0283013 | A1* | 11/2011 | Grosser et al. | 709/232 |
| 2012/0066360 | A1* | 3/2012 | Ghosh | 709/223 |
| 2013/0325810 | A1* | 12/2013 | Elder et al. | 707/645 |
| 2014/0040462 | A1* | 2/2014 | Harada | 709/224 |
| 2014/0095925 | A1* | 4/2014 | Wilson et al. | 714/4.12 |
| 2014/0344452 | A1* | 11/2014 | Lipstone et al. | 709/224 |

OTHER PUBLICATIONS

WebNMS, WebNMS Framework 5.2 Data Sheet, http://www.webnms.com/webnms/datasheet.html, downloaded from internet Oct. 5, 2012, all pages.

The Availability Digest, "Active/Active Systems—A Taxonomy", Sep. 2008, Sombers Associates, Inc., and W.H. Highleyman, www.avaiabilitydigest.com, all pages.

The Availability Digest, "Roll-Your-Own Replication Engine-Part 1", Jan. 2010, http://www.availabilitydigest.com/public_articles/0501/roll-your-own_repl_eng_1.pdf, www.availabilitydigesst.com, 2010 Sombers Associates, Inc., and W.H. Highleyman, all pages.

The Availability Digest, "What is Active/Active?", Oct. 2006, http://www.availabilitydigest.com/public_articles/0101/what_is_active-active.pdf, 2006, Sombers Associates, Inc., and W.H. Highleyman, all pages.

Gravic, "Shadowbase Solutions—Continuous Availability and Active/Active Systems", http://www.gravic.com/shadowbase/uses/continuousavailability.html, downloaded from internet: Oct. 5, 2012, all pages.

Pinchii'S Blog: "How to FailOver Crystal Reports Server 2008", http://pinchii.com/home/2010/09/how-to-failover-crystal-reports-server-2008/, downloaded from internet: Oct. 5, 2012, all pages.

Oracle(R) Fusion Middleware, High Availability Guide, 11g Release 1 (11.1.1), E10106-14, Jun. 2011, http://docs.oracle.com/cd/E15586_01/core.1111/e10106.pdf, 1150 pages.

Oracle(R) Database Advanced Replication, 11g Release 2 (11.2), Master Replication Concepts and Architecture, Part No. E10706-05, http://docs.oracle.com/cd/E11882_01/server.112/e10706/repmaster.htm#autold10, Downloaded from internet: Oct. 5, 2012, all pages.

Siebel: "Maximum Availability Architecture, Oracle Best Practices for High Availability", Oracle Maximum Availability Architecture White Paper, Oct. 2008, http://www.oracle.com/technetwork/database/features/availability/ siebelmaa-131211.pdf, all pages.

Kumar, Atul: "OAM 11g/OIM 11g High Availability (Active/Active) Architecture Documentation", Online Apps DBA, One Stop Shop for Apps DBA's, http://onlineappsdba.com/index.php/2010/12/23/oam-11g-oim-11g-high-availability-active-active-architecture-documentation, posted in Dec. 23, 2010, all pages.

The Availability Digest, "Asymmetric Active/Active at Banco de Credito", Nov. 2007, http://www.availabilitydigest.com/public_articles/0211/banco_credito.pdf, 2007 Sombers Associates, Inc. and W.H. Highleyman, all pages.

Clarke, Lawrence: "Technical Introduction to Oracle Fail Safe", A Guide to Concepts and Terminology, An Oracle Technical White Paper, Oct. 2001, http://www.oracle.com/technetwork/database/windows/fisc32-133147.pdf, all pages.

* cited by examiner

HIGH AVAILABILITY EVENT LOG COLLECTION IN A NETWORKED SYSTEM

TECHNICAL FIELD

The present disclosure is related generally to high availability systems and, more particularly, to event log collection and reporting.

BACKGROUND

Various cloud-based applications have emerged that may utilize event logging for purposes such as producing analytics and reporting. Various such networked system applications may send reports to a central infrastructure to generate analysis of how users are using the applications. These systems may include event collection, i.e., event logging, systems that capture historical state changes that include information regarding actions users have taken on the system. For example, the system captures historical data such as user intentions, shows recorded, etc., for producing post hoc analytics on system events. These reporting systems may require high availability and avoidance of single-point-of-failure issues.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
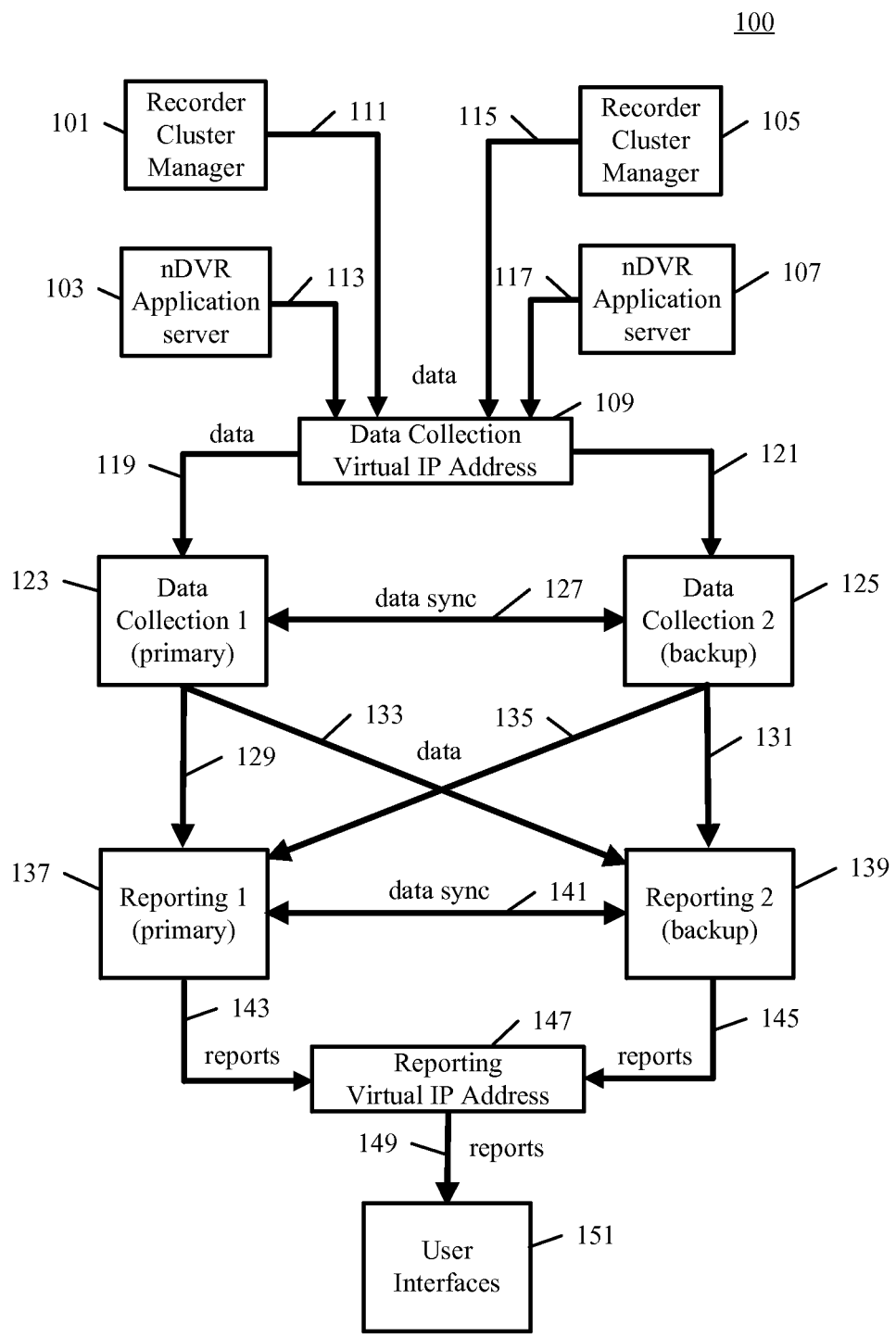
FIG. 1 is a block diagram of a network architecture for providing high availability event log collection and recording in a networked digital video recording system.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure provides an architecture and methods of operation for achieving high availability event reporting in a networked system. The architecture includes a group of four servers divided into two classes: "data collection" servers that are nodes that receive data from application servers (e.g., recorder cluster manager servers), client devices, and other networked entities that may generate data; and "reporting" servers that are nodes that archive and analyze the collected data. In accordance with the embodiments, within each class of servers, there is a separate "primary" and "backup" node to provide high availability. Two virtual IP (VIP) addresses are utilized: one for the data collection servers and one for the reporting servers, to further enhance availability. It is possible to consider these four servers in such a manner that two servers of different classes may reside upon one physical hardware node. However, the high availability property is weakened if two servers of the same class reside upon one physical hardware node. A "server," as used herein, may also refer to a process or collection of processes running upon an operating system upon a physical hardware node.

One disclosed method of operation includes generating a first file and a second file as two distinct, independent files. Each distinct, independent file is located on a respective first and second distinct, independent server. Data received at the first server are then stored to the first file. Likewise, data received at the second server are stored to the second file. The data in the first file and the second file are substantially similar. A copy of the first file is then provided to the second server by the first server and is stored by the second server. Additional data, received at the first server, are then stored to the first file, while maintaining the copy of the first file on the second server unchanged.

Further, the second server may provide a copy of the second file to the first server which is then stored by the first server. The second server may then store additional data received to the second file while the copy of the second file on the first server is maintained unchanged. The additional data received at the second server are substantially similar to the additional data received at the first server.

The first file and the copy of the second file may then be provided to an analysis application on at least one analysis server. The first file is compared with the copy of the second file and duplicate data are removed. A first event report is then generated using the first file and the copy of the second file. Also, the second file and the copy of the first file may be provided to the analysis application, compared, duplicate data removed, and a second event report may be generated using the second file and the copy of the first file. Then, the first event report with the second event report may be compared to generate a third event report.

The disclosed method may include storing the additional data received at the second server to the second file, while the first server is offline, and maintaining the copy of the first file on the second server unchanged. After the first server in back online, the second server may provide a new copy of the second file to the first server, which will then store the new copy of the second file. The various file copies may be provided between the servers using server push or client pull techniques.

The present disclosure also provides an event log collection and reporting system that has a first reporting server operatively coupled to a second reporting server. The servers are operative to form a client-server connection with the second reporting server configured as a hot standby of the first reporting server. The first reporting server is operative to receive data from at least one of two network nodes and to store the data to a first file, to provide a copy of the first file to the second reporting server, and to store additional data to the first file while the second reporting server maintains the copy of the first file on the second reporting server unchanged. The second reporting server is operative to store the copy of the first file received from the first reporting server, to receive the same data from at least one of the two network nodes, and to store the data to a second file while maintaining the copy of the first file unchanged. The second file is distinct and independent from the first file and from the copy of the first file.

The two network nodes discussed above may refer to a first data collection server operatively coupled to the first reporting server and to the second reporting server and a second data collection server operatively coupled to the first data collection server, the first reporting server, and the second reporting server. Both the first and second data collection servers are configured to receive data via a data collection VIP address The first and second data collection servers may also each include a message broker to facilitate master/slave operation between the first and second data collection servers. The first and second data collection servers may each further include a routing software instance configured to provide the data collection VIP address.

The first and second data reporting servers are both operative to implement a secure communication protocol on the client-server connection and may each include routing software instances configured to provide a reporting VIP address for routing reports to at least one analysis server.

Turning now to the drawings, FIG. 1 illustrates a network architecture 100 for providing high-availability event log collection and recording in a networked system. The example embodiment shown in FIG. 1 is related to a networked digital video recording (nDVR) system. The network architecture 100 includes a first recorder cluster manager 101 and a second recorder cluster manager 105. The first recorder cluster manager 101 is connected to a data collection VIP address 109 via network connection 111 which may be, for example, an Ethernet connection. Any of the network connections shown in FIG. 1 may be an Ethernet connection. The recorder cluster manager 105 is connected via network connection 115 to the data collection VIP address 109. The network architecture 100 also includes nDVR application servers 103 and 107 which are connected to the data collection VIP address 109 via network connections 113 and 117, respectively. Although the example embodiment of FIG. 1 includes nDVR application servers, other application servers may be used in some embodiments where event recording is useful for those applications. The recorder cluster managers 101 and 105 may be used to dispatch work for the cloud from the application servers 103 and 107. A VIP address is an Internet Protocol address that may be shared among multiple domain names or multiple servers and that routes data to the actual network interfaces for the servers. It also provides a fail-over feature in that, if a network interface on one of the connected servers fails, another server (or network interface card) can be available to reply to connections.

The portion of the network architecture subsequent to the data collection VIP address 109 provides various features of high availability to the event record collection, recording and reporting processes in accordance with the embodiments. A first high availability feature of the network architecture 100 is two data collection servers. A first data collection server 123 ("data collection server 1") receives data from the data collection VIP address 109 via network connection 119. A second data collection server 125 (also "backup" data collection server 125) receives data from the data collection VIP address 109 via network connection 121. The first data collection server 123 may also be referred to herein interchangeably as the "primary" data collection server, while the second data collection server 125 may be referred to herein interchangeably as the "backup" data collection server. A data synchronization network connection 127 is present between the first data collection server 123 and the second data collection server 125. Data synchronization network connection 127 is used to copy data received from connection 119 by the first data collection server 123 to the second data collection server 125 when the first data collection server 123 is the active master. Data synchronization network connection 127 is used to copy data received from connection 121 by the second data collection server 125 to the first data collection server 123 when the second data collection server 125 is the active master. In the various embodiments, ActiveMQ (which is described further below) may be used to maintain the data synchronization network connection 127.

A second high availability feature of the network architecture 100 is the presence of a first reporting server 137 ("reporting 1") and a second reporting server 139 ("reporting 2"). The first reporting server 137 may also be referred to herein interchangeably as the "primary" reporting server, while the second reporting server 139 may be referred to herein interchangeably as the "backup" reporting server. Each of the reporting servers has a network connection to receive data from both the primary and backup data collection servers. Specifically, the first reporting server 137 has a network connection 129 to the first data collection server 123 and network connection 135 to the second data collection server 125. Similarly, the second reporting server 139 has network connection 133 to the first data collection server 123 and network connection 131 to the second data collection server 125. A data synchronization network connection 141 is present between the first reporting server 137 and the second reporting server 139. The first reporting server 137 and the second reporting server 139 are connected to a reporting VIP address 147 via network connections 143 and 145, respectively. The reporting VIP address 147 provides reports to various analysis server user interfaces 151 via a network connection 149.

Figure 2:
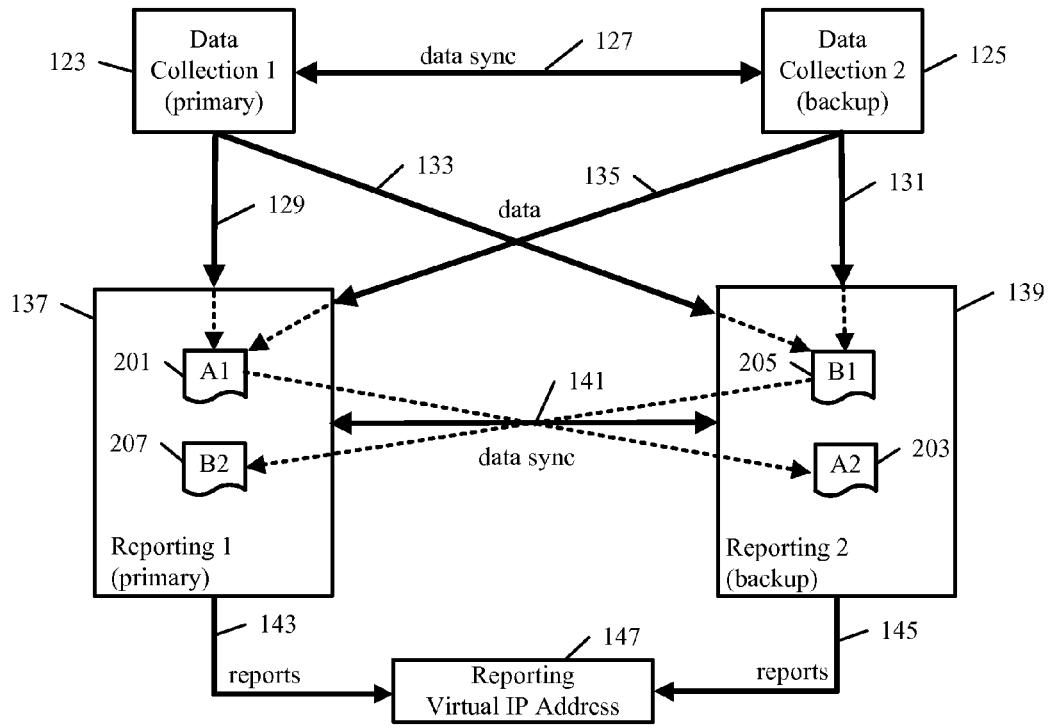
FIG. 2 is block diagram showing further details of the network architecture shown in FIG. 1.

FIG. 2 illustrates a portion of the network architecture 100 shown in FIG. 1 for the purposes of showing further details of the embodiments. As the first reporting server 137 receives data from the primary data collection server 123 and from the backup data collection server 125, it stores these data to a first file 201 shown as file "A1." Likewise the second reporting server 139 receives data from the primary data collection server 123 and from the second data collection server 125 and stores the data to a second file 205 shown as file "B1," which is a distinct and independent file from A1, the first file 201. The two files are substantially similar, in that, the event data will be the same, notwithstanding that some data may be absent in one of the files due to an outage of the reporting server. For example, if the first reporting server 137 goes off line, the second reporting server 139 operates as a "hot standby" and continues to receive and store data into the second file 205, i.e., file B1. When the first reporting server 137 comes back online or is restored, if the first file 201 was maintained, some data will be missing for the period of time that the first reporting server 137 was off line. If the file was not maintained, i.e., was irretrievably damaged or deleted, then a new file A1 must be created which will have data beginning with the time the first reporting server 137 was restored. Therefore new file A1 and file B1 will be different in that file B1 will have the legacy data that were lost to old file A1. However, as new file A1 is built, the A1 data will be the same as the data of file B1 for the same time periods in which new data were received. The first file 201 and second file 205 are also substantially similar, but not identical, because various headers or metadata associated with the two files may be different. However, the data, which are related to the event recordation, will be substantially similar with the exceptions as noted above.

Further, it is to be understood that the various files discussed herein, such as A1, B1, A2, and B2, may be collections of files, that is, more than one file. However, for simplicity of explanation, A1, B1, A2, and B2 are each referred to herein as a "file." In other words, each "file" discussed herein may be considered a primary file with a set of sub-files or as a collection of related files. The collection of related files may be a collection of time-marked files or time-indexed files.

The first reporting server 137 may form a client-server communication connection over the network connection 141 with the second reporting server 139. The client-server communication connection over network connection 141 is used for data synchronization in that, the first reporting server 137 provides a copy of the first file 201 to the second reporting server 139. The copy of the first file 203 is shown as file "A2." Likewise the second reporting server 139 provides copy of the second file 207 (i.e., file "B2") over the network connection 141 via client-server communication to the first reporting server 137. These file copies, A2 and B2, may be provided over the client-server communication using various techniques. For example the first reporting server 137 may perform a server push of the copy A2 to the second reporting server 139. Alternatively the second reporting server 139 may use a client pull and pull the first file 201 to create the copy A2. Either a server push or client pull operation as described above may also be applicable for creation of file B2, i.e., the second copy of the second file 207. The first reporting server 137 and the second reporting server 139 provide their respective files to the reporting VIP address 147 via their respective network connections, 143 and 145.

As can be understood from the diagrams of FIGS. 1 and 2, and from the corresponding description above, high availability of the reporting files is achieved by using the network architecture 100 and the file creation and copying method described above. If one of the data collection servers goes offline or fails, then the other data collection server will continue to operate. Likewise, if one of the two reporting servers goes offline or fails, then the other reporting server will continue to receive data from one or both of the data collection servers. Further, if one of the reporting servers goes offline or fails, then a copy of its latest file (i.e., B2 or A2) will be maintained by the other server without making any changes to the copies B2 or A2. Further details of the configuration of the various servers of network architecture 100 are discussed below.

Figure 3:
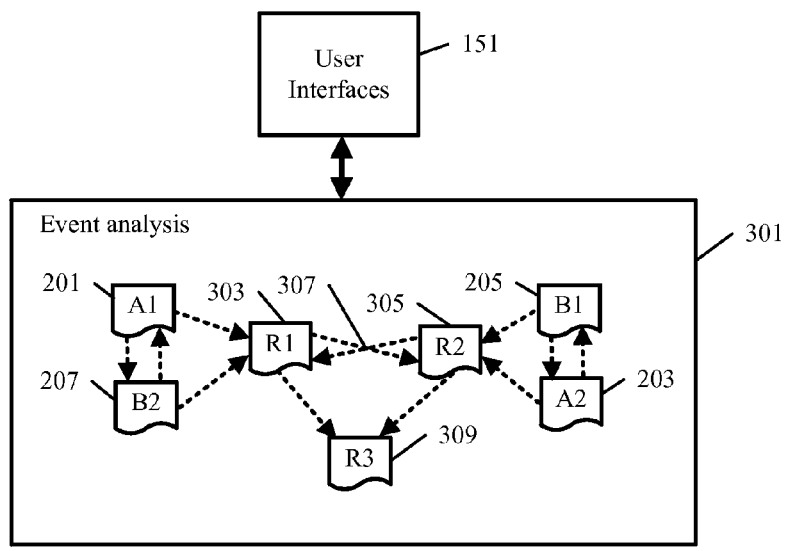
FIG. 3 is a block diagram and schematic of event analysis and report generation based on the event collection and recording obtained using the network architecture 100 which is shown in FIGS. 1 and 2.

FIG. 3 provides a block diagram and schematic of event analysis and report generation based on the event data collection obtained using the network architecture 100 as shown and described in FIGS. 1 and 2. FIG. 3 shows schematically how the event reports may be generated in various embodiments. Initially, the first reporting server 137 provides the first file 201 (A1) and the copy of the second file 207 (B2). The files A1 and B2 may then be compared to produce a first report 303 ("R1"). Likewise, the second reporting server 139 provides the second file 205 (B1) and also a copy of the first file 203 (A2) which may be compared to form a second report 305 ("R2"). The two reports, R1 and R2, may then also be subject to cross comparison 307 to remove duplicates and prepare the report 309 ("R3"). The comparisons of the files A1 with B2 and B1 with A2 may also remove any duplicate entries when producing the respective reports R1 and R2. As was also shown in FIG. 1, at least one event analysis server 301 may provide one or more user interfaces 151 that may be accessed to assist a user in event analysis and report generation and provide result outputs in various formats.

Both the first reporting server 137 and second reporting server 139 receive the same data from the data collection servers 123 and 125, on a time basis pattern. The two reporting servers then synchronize the files with each other via a client-server connection, or a peer-to-peer connection in some embodiments, before returning to a sleep mode. This "synchronization" is decoupled from the data collection process and provides a copy of each reporting server's corresponding file to the other reporting server. Thus, if one of the reporting servers goes down (i.e., goes off line or fails) it loses the true order of events. In accordance with the embodiments no integration of the files maintained by the reporting servers is performed. Instead, files A1 and B1 are maintained independently, and the corresponding file copies A2 and B2 are also maintained independently.

Further details on the configuration of the various servers and IP addresses of the network architecture 100 are now described. The application servers 103 and 107 may utilize an open source web server and servlet such as Tomcat (also referred to as Apache Tomcat) that provides a Java HTTP web server environment for running Java code. As understood by those of ordinary skill, Tomcat also includes configuration and management tools and may also be configured by the editing of XML configuration files.

The reporting system of network architecture 100 as described with respect to FIGS. 1 and 2 is designed to be installed on a group of four servers as shown, the first data collection server 123, the second data collection server 125, the first reporting server 137, and the second reporting server 139. The four servers are divided into two classes: i.e., the "data collection" servers are nodes that receive data from the application and recorder cluster manager servers, and "reporting" servers are nodes that archive and analyze the collected data. In accordance with the embodiments, within each class of servers, there is a separate "primary" and "backup" node to provide high availability. Although the example embodiment illustrated in FIG. 1 shows that dedicated servers are provided for hosting the data collection and reporting services, in some embodiments, co-location with other services is possible if necessary. To help provide the high availability requirement, two VIP addresses are configured for reporting, one for the data collection servers and one for the reporting servers. These VIP addresses are maintained by routing software applicable for load-balancing and high availability such as, for example, "Keepalived" which is routing software based on the C-programming language. Further, there are no firewall rules affecting communication between any of the reporting servers, including the data collection servers 123 and 125 and the reporting servers 137 and 139.

Each of the data collection servers and the reporting servers has software installed that includes an operating system, web server, routing software and support for a programming language such as Java. Examples of operating systems that may be used in the embodiments include FreeBSD, NetBSD, OpenBSD, the Community enterprise Operating System, and Red Hat Enterprise Linux. The servers are all configured to have email enabled.

The data collection servers 123 and 125 each have routing software instances that are configured to provide the VIP address for those nodes, represented in FIG. 1 as the data collection VIP address 109. The primary data collection server, i.e., the first data collection server 123, is set up to have a higher priority so that data traffic will always be directed to it as long as it is up and running. The VIP address 109, in accordance with the embodiments, will fail over if the web server software (for example, Tomcat) on one of the data collection servers goes down.

The routing software instances present on the reporting servers 137 and 139 are configured to provide a different VIP address for the reporting nodes which is shown as reporting VIP address 147. The VIP address is also tied to the web server software. Unlike with the data collection servers 123 and 125, however, the two reporting servers 137 and 139 are configured to have equal priority for their VIP address so that the VIP address will remain with whichever reporting server has been up the longest.

The data collection server software also includes a message broker such as, for example, Apache ActiveMQ which facilitates a master/slave mode. In one embodiment, the configuration of ActiveMQ for the data collection servers 123 and 125 configures the "backup" data collection server 125 as the ActiveMQ master and configures the "primary" data collection server 123 as the ActiveMQ slave. The ActiveMQ message broker may be started on the data collection servers 123 and 125 which then deploy a data collection web service in the web server software.

As described above, the reporting servers 137 and 139 periodically synchronize their files over the data sync network connection 141 so that data are not lost if one of the reporting servers fails. This may be accomplished in the embodiments using a secure communication protocol, for example, Secure Shell cryptographic network protocol for secure data communication and, for example, the "rsync" software application for synchronizing files and directories quickly with minimum data transfer. That is, the primary reporting server 137 and backup reporting server 139 will write to separate directories, and their files are mirrored over the data sync network connection 141 using, for example, the rsync software application.

The recorder cluster managers 101 and 105 and the nDVR application servers 103 and 107 are all configured to post data to the data collection VIP address 109. Testing was performed using a configuration similar to that shown in FIGS. 1 and 2, and various failure conditions were simulated for loss of network on the data collection server, power loss on the data collection servers, stopping of the web server software on the data collection server, and loss of various cables. Upon such failure conditions of a data collection server the remaining operating server was observed to take over as the ActiveMQ master and receive data over the VIP address per the design. Reporting operations were maintained with the desired high availability for all the tested failure conditions.

Figure 4:
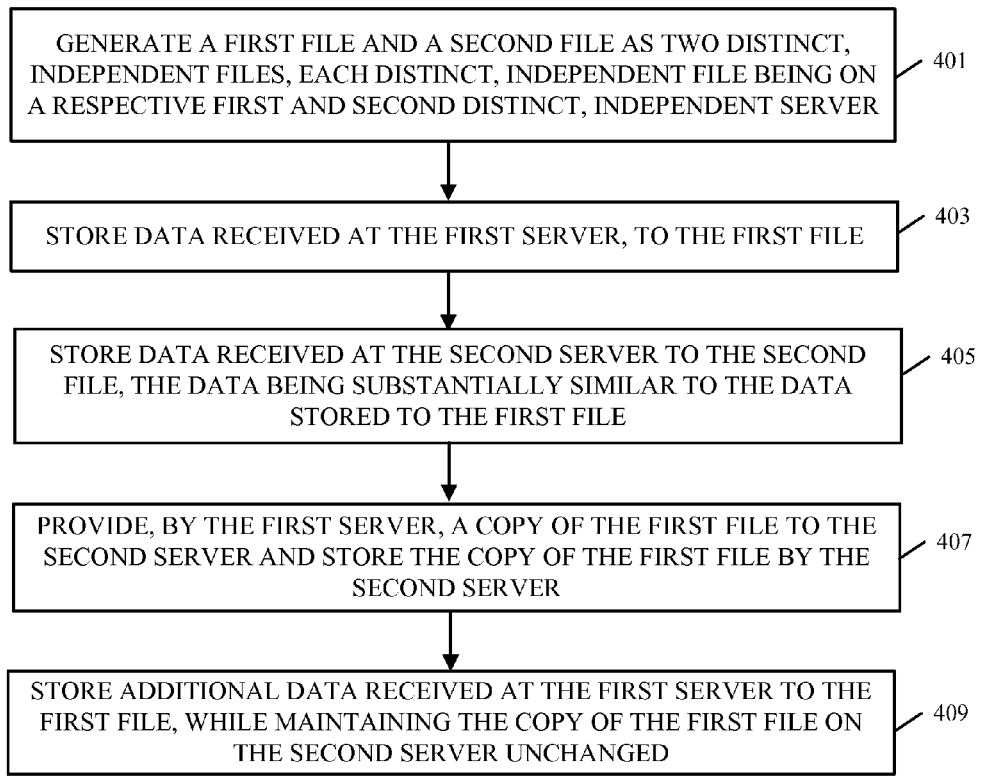
FIG. 4 is a flowchart illustrating a method of operation of the reporting servers shown in FIGS. 1 and 2 in accordance with an embodiment.

FIG. 4 is a flowchart illustrating a method of operation of the reporting servers shown in FIGS. 1 and 2 in accordance with an embodiment. As shown in 401, a first file and a second file are generated as two distinct independent files. Each distinct independent file is located on a respective first and second distinct independent server. In 403, data received at the first server are stored to the first file. In 405, data received at the second server are stored to the second file. The data are substantially similar to the data stored in the first file. For example, some of the header information and metadata may be different. However, the event data of the file are the same with the exception of data lost during any outages that may have occurred on one or both of the servers. In 407, a copy of the first file is provided to the second server by the first server. The second server stores the copy of the first file. In 409, additional data received by the first server are stored to the first file while the copy of the first file in the second server is maintained unchanged.

Figure 5:
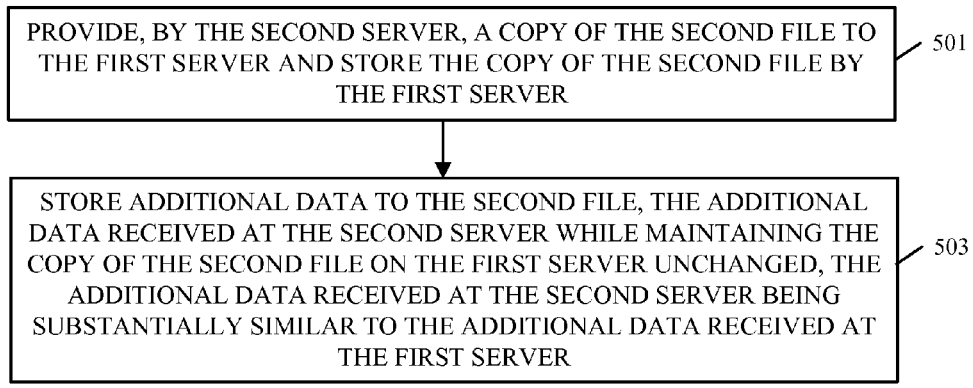
FIG. 5 is a flowchart illustrating a method of operation of the reporting servers shown in FIGS. 1 and 2 in accordance with an embodiment.

FIG. 5 is a flowchart illustrating a method of operation of the reporting servers shown in FIGS. 1 and 2 in accordance with an embodiment. In 501, the second server provides a copy of the second file to the first server which then stores the file. In 503, additional data received at the second server are stored to the second file while the copy of the second file in the first server is maintained unchanged. The additional data received at the second server are substantially similar to the additional data received at the first server.

Figure 6:
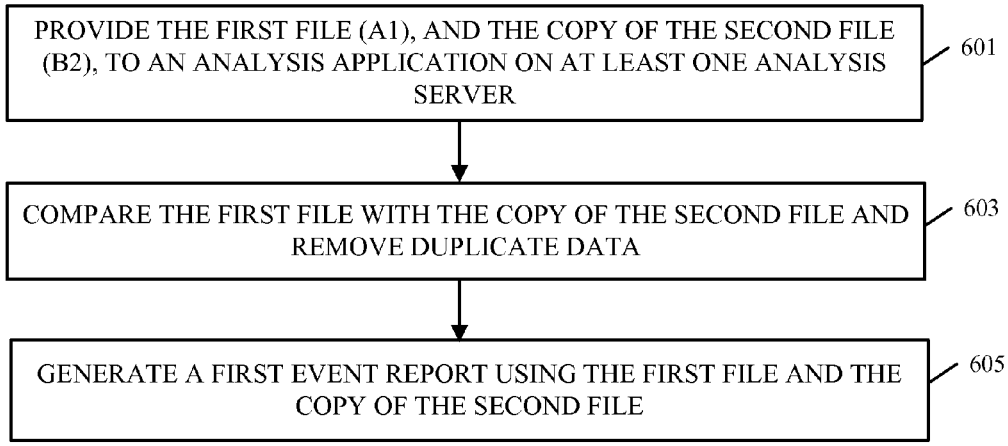
FIG. 6 is a flowchart illustrating a method of report generation in accordance with an embodiment.

FIG. 6 is a flowchart illustrating a method of report generation in accordance with an embodiment. In 601, the first file and a copy of the second file are provided to an analysis application and at least one analysis server. In 603, the first file is then compared with the copy of the second file and any duplicate data are removed. A first event report is then generated using the first file and a copy of the second file as shown in 605.

Figure 7:
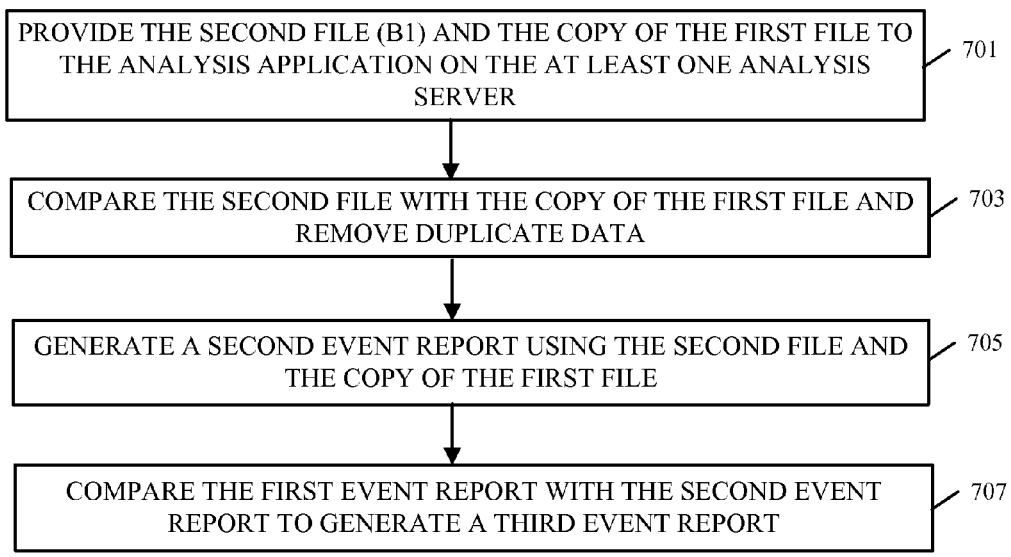
FIG. 7 is a flowchart illustrating a method of report generation in accordance with an embodiment.

FIG. 7 is a flowchart illustrating a method of report generation in accordance with an embodiment. In 701, the second file and a copy of the first file is provided to the analysis application on the at least one analysis server. In 703, the second file is compared with a copy of the first file and any duplicate data are removed. As shown in 705, a second event report is generated using the second file and copy of the first file. The first event report may then be compared with the second event report to generate a third event report as shown in 707.

Figure 8:
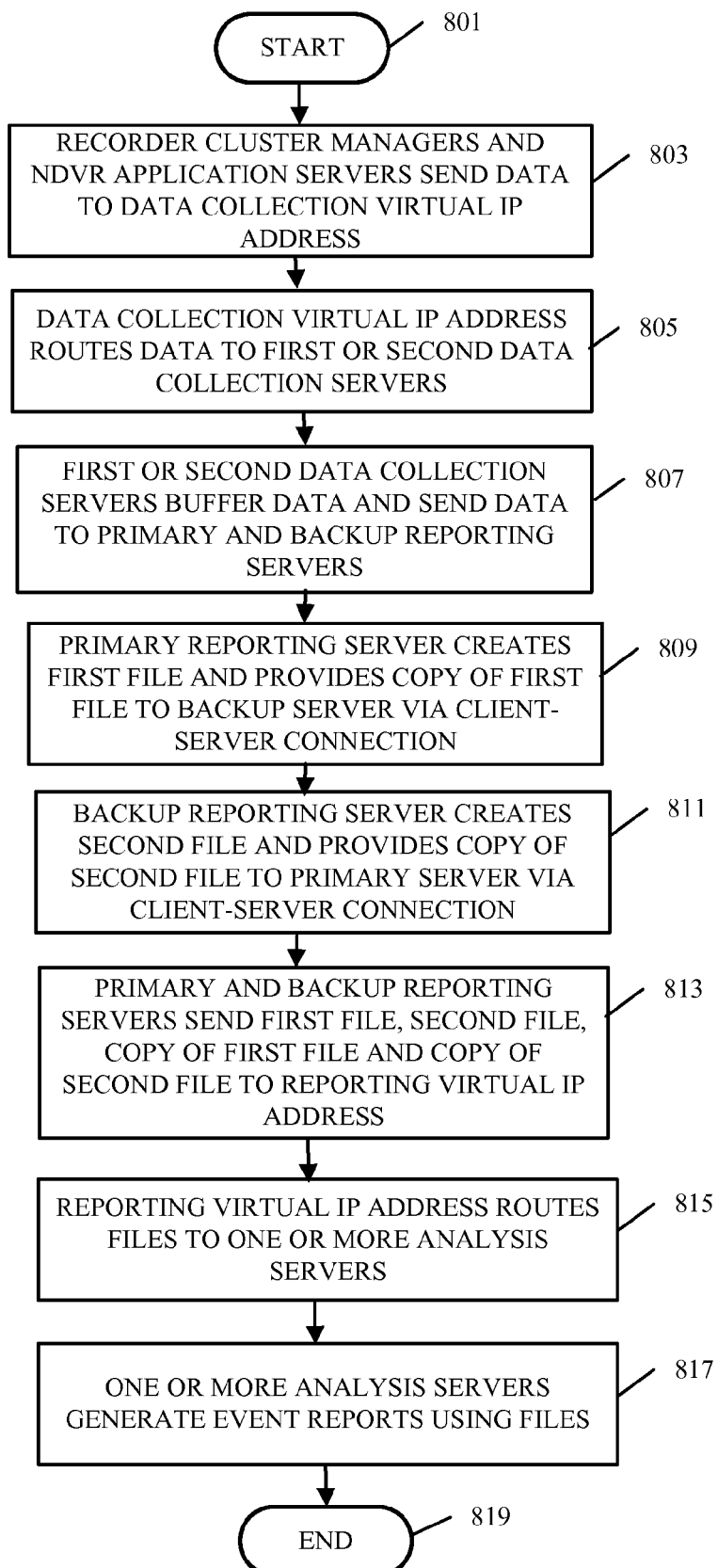
FIG. 8 is a flowchart illustrating a method of operation of the network architecture of FIG. 1 in accordance with an embodiment.

FIG. 8 is a flowchart illustrating a method of operation of the network architecture of FIG. 1 in accordance with an embodiment. The process starts as shown in 801, and in 803 the recorder cluster managers and the nDVR application servers send data to the data collection VIP address 109. In 805, the data collection VIP address 109 routes data to either of the first or the second data collection servers 123 and 125, depending on which is the active master. In one arrangement that may occur in accordance with the embodiments: If the primary data collection server 123 is accessible (and thus the active master), it will receive the data, otherwise, the data will be received by the backup data collection server 125. In some embodiments, the backup data collection server 125 may retain the active mastership even if primary data collection server 123 is made available after its failure. The data collection server then buffers the data, and to ensure high availability, may perform a data sync operation 127 with the other data collection server if that server is online. In one embodiment, for example, the data may be buffered by a master ActiveMQ broker, which would then send the data to the slave broker. Once the data are buffered, the data collection server that received them sends the data to both the primary and backup reporting servers 137 and 139. In some embodiments, the first and second data collection servers 123 and 125 may also then buffer the data, and each data collection server sends data to both the primary and backup reporting servers 137 and 139. In some embodiments, after the buffering step, the first data collection server 123 may send data to the primary reporting server 137 and have the second collection server 125 send data to the backup reporting server 139. In 809, the primary reporting server 137 creates a first file and provides a copy of the first file to the backup reporting server 139 via a client/server connection. In 811, the backup reporting server 139 creates a second file and provides a copy of the second file to the primary reporting server 137 via the client/server connection. In 813, the primary reporting server 137 and backup reporting server 139 send the first file, the second file, the copy of the first file, and the copy of the second file to the reporting VIP address 147. In 815, the VIP address 147 routes the files to one or more analysis servers. As shown in 817, the one or more analysis servers may then generate event reports using the files. The process ends in 819 as shown.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   when a primary data collection server is accessible:
   receiving, at the primary data collection server residing upon an associated physical hardware node, collected data via a data collection virtual Internet protocol address; and
   transmitting a collected data copy of the collected data received at the primary data collection server from the primary data collection server to a backup data collection server through a data synchronization network connection operatively coupling the primary data collection server and the backup data collection server, the backup data collection server residing upon an associated physical hardware node and configured as a hot standby of the primary data collection server;
   when the primary data collection server is inaccessible, receiving, at the backup data collection server, the collected data via the data collection virtual Internet protocol address;
   generating a first file and a second file as two distinct, independent files, the first file being on a first server, the second file being on a second server, the first server and the second server operatively coupled to each of the primary data collection server and the backup data collection server;
   storing, at the first sever, data associated with the collected data to the first file, the data stored to the first file being received at the first server from at least one of the primary data collection server or the backup data collection server;
   storing, at the second server, data associated with the collected data to the second file, the data stored to the second file being received at the second server from at least one of the primary data collection server or the backup data collection server, the data stored to the second file being substantially similar to the data stored to the first file;
   providing a first file copy of the first file to the second server by the first server and storing the first file copy of the first file by the second server; and
   storing, at the first server, additional data to the first file, the additional data stored to the first file being received at the first server while maintaining the first file copy of the first file on the second server unchanged.

2. The method of claim 1 further comprising:
   providing a second file copy of the second file to the first server by the second server and storing the second file copy of the second file by the first server; and
   storing, at the second server, additional data to the second file, the additional data stored to the second file being received at the second server while maintaining the second file copy of the second file on the first server unchanged, the additional data received at the second server being substantially similar to the additional data received at the first server.

3. The method of claim 1 further comprising:
   providing, by the first server, the first file and the second file copy of the second file to an analysis application on at least one analysis server;
   comparing, by the analysis application, the first file with the second file copy of the second file and removing duplicate data; and
   generating, by the analysis application, a first event report using the first file and the second file copy of the second file.

4. The method of claim 3 further comprising:
   providing, by the second server, the second file and the first file copy of the first file to the analysis application on the at least one analysis server;
   comparing, by the analysis application, the second file with the first file copy of the first file and removing duplicate data;
   generating, by the analysis application, a second event report using the second file and the first file copy of the first file; and
   comparing, by the analysis application, the first event report with the second event report to generate a third event report.

5. The method of claim 1 further comprising:
   when the first server goes offline, receiving, at the second server, new additional data sent to the first server but not received by the first server;
   storing, by the second server, the new additional data received by the second server to the second file; and
   maintaining the first file copy of the first file on the second server unchanged.

6. The method of claim 5 further comprising:
   when the first server goes back online, providing a new second file copy of the second file to the first server by the second server and storing the new second file copy of the second file by the first server.

7. The method of claim 1 wherein providing a first file copy of the first file to the second server by the first server comprises:
   performing a server push from the first server to the second server.

8. The method of claim 1 wherein providing a first file copy of the first file to the second server by the first server comprises:
   performing a client pull by the second server from the first server.

9. The method of claim 1, wherein the primary data collection server or the backup data collection server receives the collected data from one or more application servers via the data collection virtual internet protocol address, and the one or more application servers are associated with event recording.

10. The method of claim 9, wherein the one or more application servers comprise networked digital video recording servers.

11. An event log collection and reporting system comprising:
   physical hardware nodes;
   a primary data collection server configured to receive collected data via a data collection virtual Internet protocol address when the primary data collection server is accessible, the primary data collection server residing upon an associated physical hardware node;
   a backup data collection server operatively coupled to the primary data collection server via a data synchronization network connection configured to provide a copy of the collected data received by the primary data collection server to the backup data collection server, the backup data collection server residing upon an associated physical hardware node and configured as a hot standby of the primary data collection server to receive the collected data via the data collection virtual Internet protocol address when the primary data collection server is inaccessible;

a first reporting server operatively coupled to a second reporting server, the first reporting server and the second reporting server operative to form a client-server connection there-between, the second reporting server configured as a hot standby of the first reporting server;

the first reporting server operatively coupled to the primary data collection server and the backup data collection server, the first reporting server operative to:

receive data associated with the collected data from at least one of—the primary data collection server or the backup data collection server and store the data to a first file;

provide a first file copy of the first file to the second reporting server; and store additional data to the first file, the additional data stored to the first file being received at the first reporting server, while the second reporting server maintains the first file copy of the first file on the second reporting server unchanged;

the second reporting server operatively coupled to the primary data collection server and the backup data collection server, the second reporting server operative to:

store the first file copy of the first file received from the first reporting server; and receive the data associated with the collected data from at least one of the primary or backup data collection servers and store the data to a second file while maintaining the first file copy of the first file unchanged, the second file being distinct and independent from the first file and from the first file copy of the first file.

12. The event log collection and reporting system of claim 11 wherein the primary data collection server and the backup data collection server each include:

a message broker to facilitate master/slave operation between the primary data collection server and the backup data collection server.

13. The event log collection and reporting system of claim 12 wherein the primary data collection server and the backup data collection server each further include:

a routing software instance configured to provide the data collection virtual Internet protocol address.

14. The event log collection and reporting system of claim 13 wherein the first and second reporting servers are both operative to implement a secure communication protocol on the client-server connection there-between.

15. The event log collection and reporting system of claim 13 wherein the first and second reporting servers each include:

a routing software instance configured to provide a reporting virtual Internet protocol address for routing reports to at least one analysis server.

16. The event log collection and reporting system of claim 11, wherein the primary data collection server or the backup data collection server receives the collected data from one or more application servers via the data collection virtual internet protocol address, and the one or more application servers are associated with event recording.

17. The event log collection and reporting system of claim 16, wherein the one or more application servers comprise networked digital video recording servers.

18. A method comprising:

sending event data to a data collection virtual Internet Protocol (VIP) address by at least one application server and at least one recorder cluster manager;

when a first data collection server is accessible:
routing the event data over the data collection VIP address to the first data collection server residing upon an associated physical hardware node;

transmitting an event data copy of the event data received at the first data collection server to a second data collection server operatively coupled to the first data collection server, the second data collection server residing upon an associated physical hardware node and configured as a hot standby of the first data collection server;

when the first data collection server is inaccessible, routing the event data over the data collection VIP address to the second data collection server;

sending the event data from the first data collection server or from the second data collection server to a primary reporting server and to a backup reporting server, each reporting server operatively coupled to the first data collection server and the second data collection server;

creating a first file by the primary reporting server and providing a first file copy of the first file to the backup reporting server via a client-server connection;

creating a second file by the backup reporting server, the second file being substantially similar to the first file, and providing a second file copy of the second file to the primary reporting server via the client-server connection;

sending the first file and the second file copy of the second file to a reporting VIP address by the primary reporting server;

sending the second file and the first file copy of the first file to the reporting VIP address by the backup reporting server; and generating at least one event report by at least one analysis server using the first file, the second file, the first file copy of the first file, and the second file copy of the second file.

19. The method of claim 18, wherein the at least one application server comprises a networked digital video recording server.

* * * * *